US010131345B2

(12) United States Patent
Matsui et al.

(10) Patent No.: US 10,131,345 B2
(45) Date of Patent: Nov. 20, 2018

(54) HYBRID VEHICLE CONTROL DEVICE

(71) Applicant: NISSAN MOTOR CO., LTD., Yokohama-shi, Kanagawa (JP)

(72) Inventors: Hiroki Matsui, Ebina (JP); Hiroki Shimoyama, Ebina (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 82 days.

(21) Appl. No.: 14/654,077

(22) PCT Filed: Dec. 20, 2013

(86) PCT No.: PCT/JP2013/084340
§ 371 (c)(1),
(2) Date: Jun. 19, 2015

(87) PCT Pub. No.: WO2014/103960
PCT Pub. Date: Jul. 3, 2014

(65) Prior Publication Data
US 2015/0329105 A1    Nov. 19, 2015

(30) Foreign Application Priority Data

Dec. 25, 2012 (JP) ................. 2012-280504

(51) Int. Cl.
*B60W 20/00* (2016.01)
*B60W 20/40* (2016.01)
(Continued)

(52) U.S. Cl.
CPC ............. *B60W 20/40* (2013.01); *B60K 6/48* (2013.01); *B60K 6/547* (2013.01); *B60L 11/14* (2013.01);
(Continued)

(58) Field of Classification Search
CPC ...... B60W 20/40; B60W 20/10; B60W 10/02; B60W 10/06
See application file for complete search history.

(56) References Cited

U.S. PATENT DOCUMENTS 6,244,368 B1 *   6/2001   Ando ................. B60K 6/48
                                                    180/65.25
8,996,217 B2 *   3/2015   Tanishima ........... B60L 11/123
                                                    180/65.245
(Continued)

FOREIGN PATENT DOCUMENTS

JP           2010-202151 A     9/2010
WO    WO-2012053633 A1 *   4/2012   ............... B60K 6/48

*Primary Examiner* — Jelani A Smith
*Assistant Examiner* — Donald J Wallace
(74) *Attorney, Agent, or Firm* — Foley & Lardner LLP

(57) ABSTRACT

An object of the invention is to provide a hybrid vehicle control device capable of shortening the time from an engine start request to the engine start. The hybrid vehicle control device is provided with an integrated controller configured to execute processing for starting an engine by bringing a first clutch into engagement, while slipping a second clutch, and by increasing a torque of a motor generator, when it has been determined that an engine start request is present, and a first clutch engagement control section, which is included in the integrated controller and configured to command a start of engagement of the first clutch once the difference between the torque of the motor generator and a second clutch transmitted torque capacity command value becomes greater than or equal to a preset slip prediction determination threshold value after having been determined that the engine start request is present.

6 Claims, 13 Drawing Sheets

(51) Int. Cl.
- *B60W 20/10* (2016.01)
- *B60K 6/48* (2007.10)
- *B60K 6/547* (2007.10)
- *B60L 11/14* (2006.01)
- *B60L 15/20* (2006.01)
- *B60W 10/02* (2006.01)
- *B60W 10/06* (2006.01)
- *F16D 48/06* (2006.01)

(52) U.S. Cl.
CPC ......... *B60L 15/2054* (2013.01); *B60W 10/02* (2013.01); *B60W 10/06* (2013.01); *B60W 20/10* (2013.01); *F16D 48/062* (2013.01); *B60L 2240/423* (2013.01); *B60L 2240/486* (2013.01); *B60L 2240/507* (2013.01); *B60W 2510/083* (2013.01); *B60W 2710/021* (2013.01); *B60W 2710/025* (2013.01); *B60W 2710/0666* (2013.01); *B60Y 2300/429* (2013.01); *F16D 2500/1066* (2013.01); *F16D 2500/3056* (2013.01); *F16D 2500/3065* (2013.01); *F16D 2500/30421* (2013.01); *F16D 2500/3166* (2013.01); *F16D 2500/50227* (2013.01); *F16D 2500/525* (2013.01); *F16D 2500/70426* (2013.01); *F16D 2500/70456* (2013.01); *Y02T 10/6221* (2013.01); *Y02T 10/645* (2013.01); *Y02T 10/70* (2013.01); *Y02T 10/7077* (2013.01); *Y02T 10/7275* (2013.01); *Y10S 903/93* (2013.01)

(56) References Cited

U.S. PATENT DOCUMENTS

| | | | |
|---|---|---|---|
| 2007/0056784 A1* | 3/2007 | Joe | B60K 6/48 180/65.245 |
| 2007/0080005 A1* | 4/2007 | Joe | B60K 6/48 180/65.245 |
| 2011/0021312 A1* | 1/2011 | Fukitani | B60K 6/48 477/5 |
| 2011/0295455 A1* | 12/2011 | Schenk | F16D 48/06 701/22 |
| 2013/0012353 A1* | 1/2013 | Yoshida | B60K 6/48 477/5 |
| 2013/0210575 A1* | 8/2013 | Kumazaki | B60K 6/48 477/20 |
| 2013/0231815 A1* | 9/2013 | Tanishima | B60K 6/48 701/22 |
| 2013/0231833 A1* | 9/2013 | Burtch | B60W 10/02 701/67 |
| 2013/0297162 A1* | 11/2013 | Dai | B60W 20/30 701/55 |
| 2013/0304293 A1* | 11/2013 | Yoshikawa | B60K 6/48 701/22 |

* cited by examiner

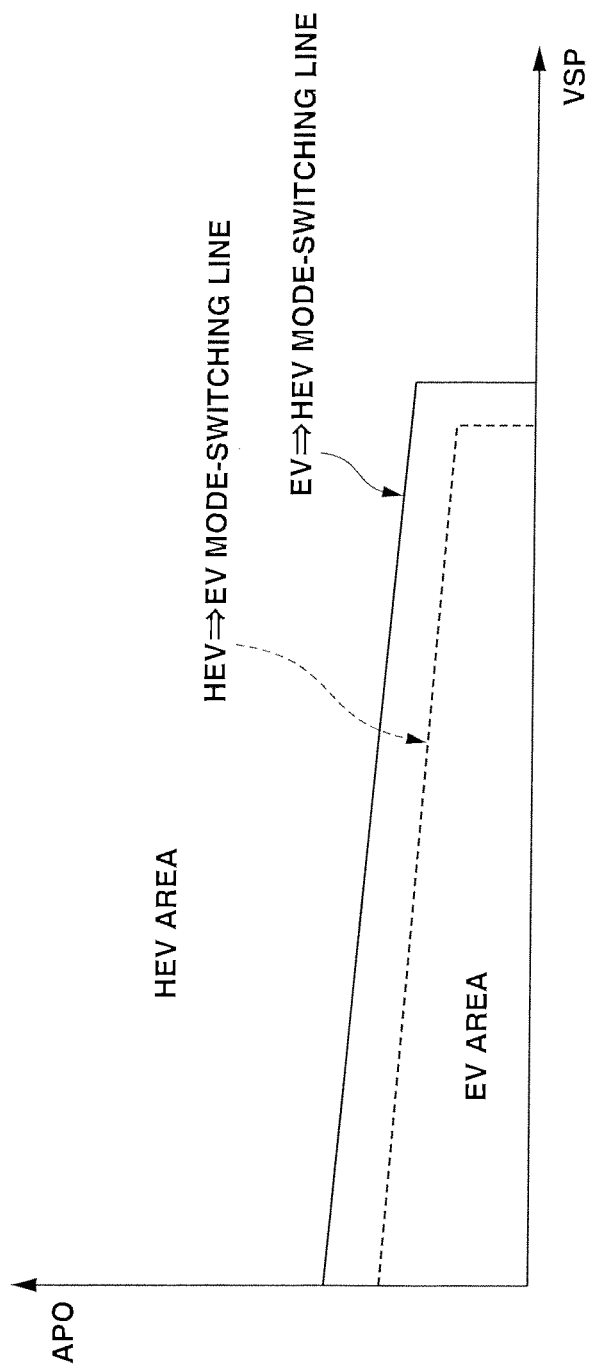

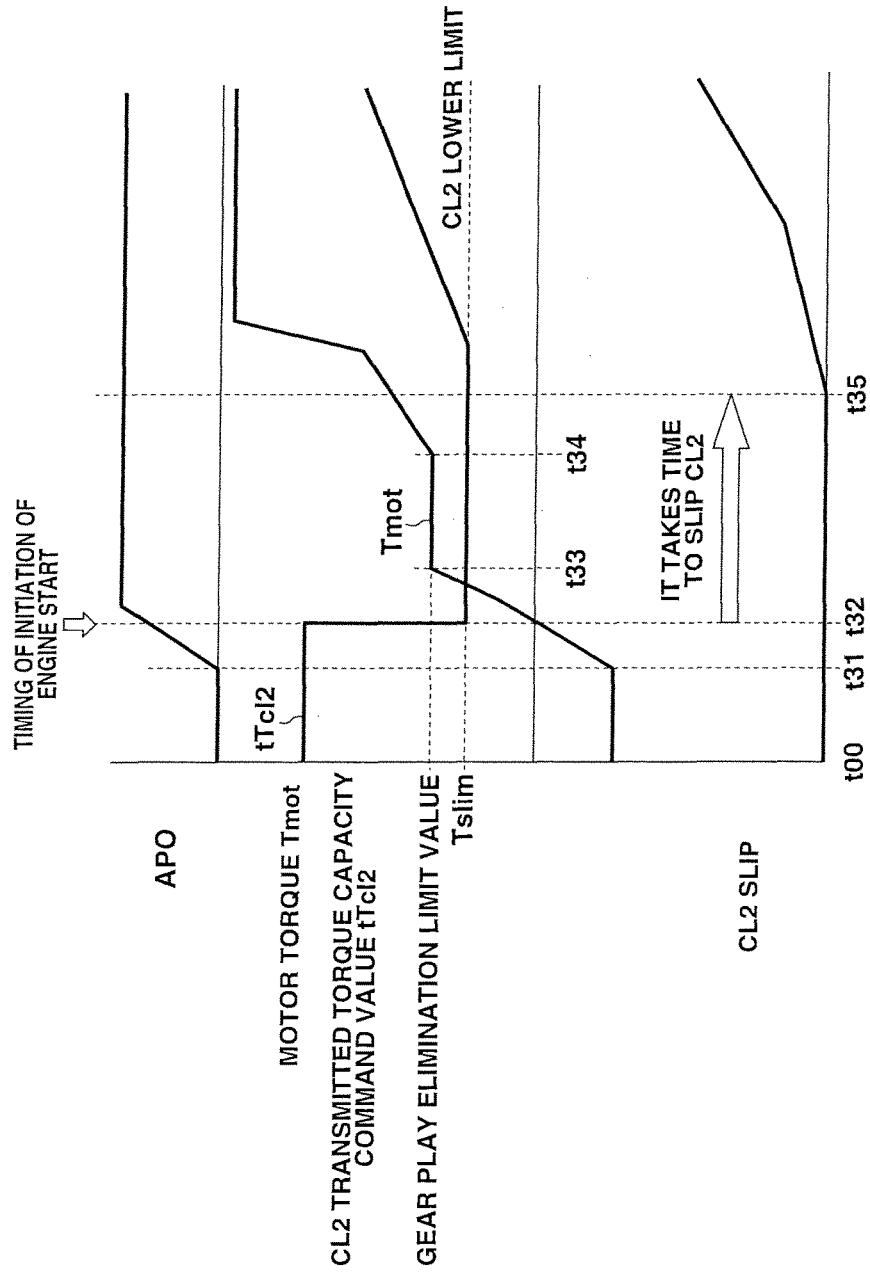

HYBRID VEHICLE CONTROL DEVICE

TECHNICAL FIELD

The present invention relates to a hybrid vehicle control device, and specifically to engine start control.

BACKGROUND ART

As is generally known, in a hybrid vehicle, a clutch, which is disposed between a motor generator and an engine, is engaged during start of the engine for starting the engine by a motive power from the motor generator (see Patent document 1).

In the above prior art, an engine, a first clutch, a motor generator, and a second clutch are arranged in series with each other in that order from the side of a driving power source to the side of drive road wheels in a power-train system.

When an engine start request is made, the motor generator (the motor) is torque-controlled, and the first clutch is brought into engagement, while slipping the second clutch, thereby increasing revolution speeds of the motor so as to start the engine. At this time, fully taking account of gear rattling, which may occur from a coast state, engagement of the first clutch starts after a preset stand-by time, measured from the engine start request, has expired.

CITATION LIST

Patent Literature

Patent document 1: Japanese Patent Provisional Publication No. 2010-202151

SUMMARY OF INVENTION

Technical Problem

In the previously-discussed prior art, a delay in slip start timing of the second clutch often occurs owing to a response delay in hydraulic control when the second clutch is brought into a slip.

Therefore, it is necessary to set the stand-by time from an engine start request to the start of engagement of the first clutch to an appropriate time under consideration of a delay in slip start timing of the second clutch.

For this reason, a time delay from an engine start request to the engine start has occurred.

It is, therefore, in view of the previously-described drawbacks, an object of the invention to provide a hybrid vehicle control device capable of shortening the time from an engine start request to the engine start.

Solution to Problem

In order to accomplish the aforementioned objects of the invention, in a hybrid vehicle control device according to the present invention, an engine start control section, which is configured to start an engine by bringing a first clutch into engagement, while slipping a second clutch and by increasing a driving torque of a motor during start of the engine, is provided with a first clutch engagement control section configured to command a start of engagement of the first clutch once the difference between the driving torque of the motor and a transmitted torque capacity of the second clutch becomes greater than or equal to a preset slip prediction determination threshold value after it has been determined that there is an engine start request.

Advantageous Effects of Invention

According to the invention, the first clutch engagement control section of the engine start control section is configured to command a start of engagement of the first clutch once the difference between the driving torque of the motor and the transmitted torque capacity of the second clutch exceeds a preset engagement start determination threshold value during start of the engine.

Hence, according to the present invention, it is possible to command a start of engagement of the first clutch at an earlier time than the time when the second clutch begins to actually slip. Therefore, as compared to the control device configured to command a start of engagement after a given stand-by time has expired from an engine start request, the device of the present invention can advance engagement start timing of the first clutch, thus enabling engine start timing to be advanced.

BRIEF DESCRIPTION OF DRAWINGS

FIG. 3 is an EV-HEV selection map used to execute mode-selection processing within the integrated controller of the hybrid vehicle control device of the first embodiment.

FIG. 14 is a time chart illustrating an example of operation of a comparative example, which is compared to the hybrid vehicle control device of the first embodiment.

DESCRIPTION OF EMBODIMENTS

The preferred embodiments, which realize a hybrid vehicle control device of the present invention, are hereinafter described with reference to the drawings.

First Embodiment

First of all, the configuration of the hybrid vehicle control device of the first embodiment is explained.

In explaining this configuration, the configuration of the hybrid vehicle control device of the first embodiment is classified into four sections, that is, "POWER-TRAIN SYSTEM CONFIGURATION", "CONTROL SYSTEM CONFIGURATION", "CONFIGURATION OF INTEGRATED CONTROLLER", and "PROCESSING AND CONFIGURATION OF ENGINE START CONTROL SECTION".

[Power-Train System Configuration]

First, the power-train system configuration of the hybrid vehicle of the first embodiment is hereunder explained.

Figure 1:
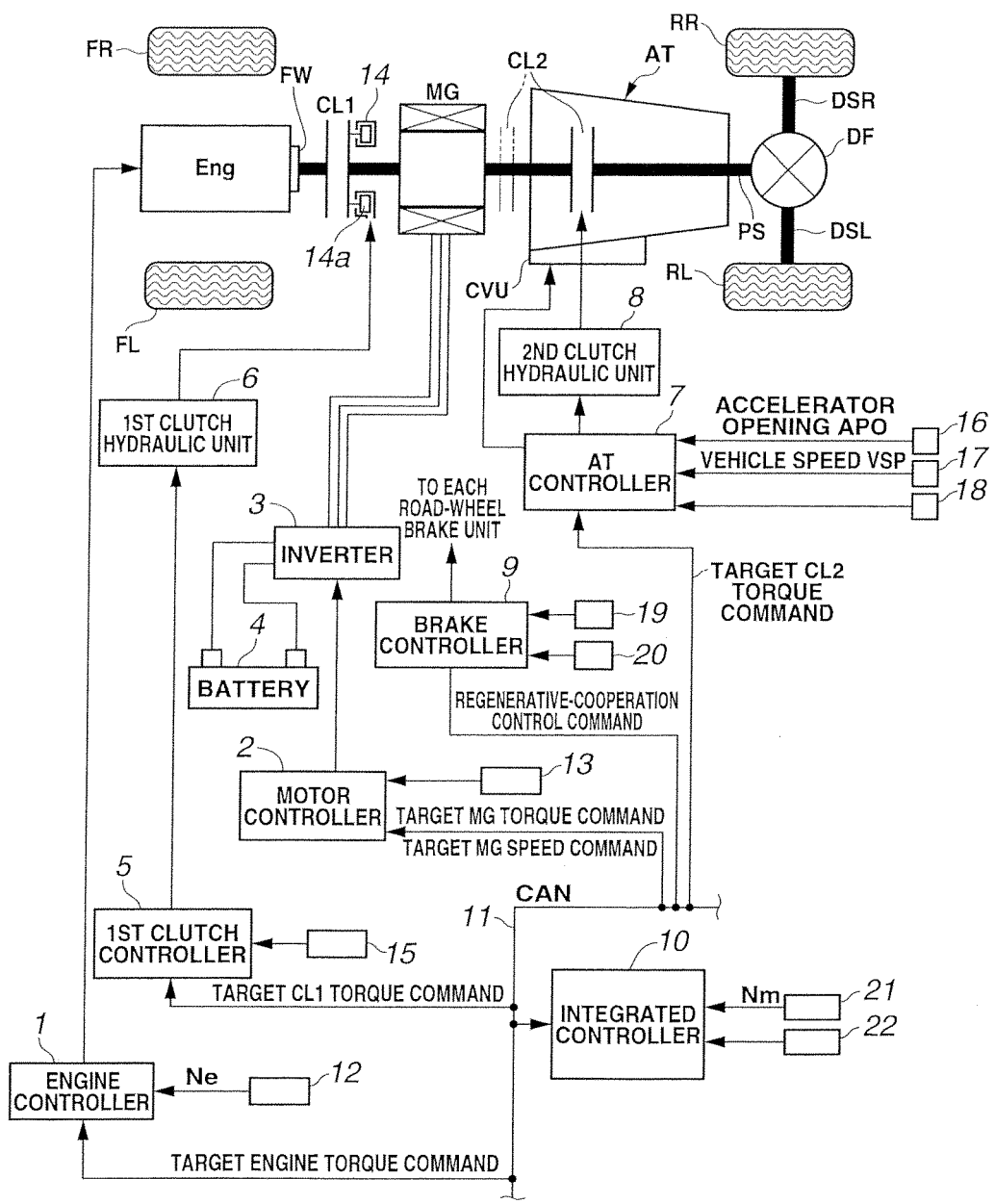
FIG. 1 is a system block diagram illustrating a power-train system of a hybrid vehicle to which a hybrid vehicle control device of the first embodiment is applied.

FIG. 1 is an entire system block diagram illustrating a rear-wheel-drive hybrid vehicle to which the hybrid vehicle driving torque control device of the first embodiment is applied.

As shown in FIG. 1, the drive system of the hybrid vehicle of the first embodiment is equipped with an engine Eng, a flywheel FW, a first clutch CL1, a motor generator MG, a second clutch CL2, an automatic transmission AT, a propeller shaft PS, a differential DF, a left driveshaft DSL, a right driveshaft DSR, a rear-left road wheel (a drive wheel) RL, a rear-right road wheel (a drive wheel) RR, a front-left road wheel FL, and a front-right road wheel FR.

Engine Eng is a gasoline engine or a Diesel engine. Engine start control, engine stop control, and valve opening control of a throttle valve are carried out based on an engine control command from an engine controller 1. By the way, flywheel FW is attached to an engine output shaft.

The first clutch CL1 is a clutch interposed between engine Eng and motor generator MG. Engagement/disengagement (containing a half-clutch state) of the first clutch CL1 is controlled, based on a first clutch control command from a first clutch controller 5, by a first clutch control hydraulic pressure produced by a first clutch hydraulic unit 6. For instance, a dry single-disc clutch, whose engagement/disengagement is controlled by means of a hydraulic actuator 14 having a piston 14a, is used as the first clutch CL1.

Motor generator MG is a synchronous motor generator in which a permanent magnet is embedded in a rotor and a stator coil is wound on a stator. The motor generator is controlled, based on a control command from a motor controller 2, by applying three-phase alternating current produced by an inverter 3. Motor generator MG operates as an electric motor rotatively driven by electric power supply from a battery 4, which operating condition is hereinafter referred to as "power-running". Motor generator MG also functions as a generator that generates an electromotive force at both ends of the stator coil when the rotor receives rotational energy from the engine Eng or the drive road wheels, thereby charging the battery 4, which operating condition is hereinafter referred to as "regenerative operation". By the way, the rotor of motor generator MG is connected through a damper to the transmission input shaft of automatic transmission AT.

The second clutch CL2 is a clutch interposed between motor generator MG and rear-left and rear-right road wheels RL-RR. Engagement/disengagement (containing slip-engagement and slip-disengagement) of the second clutch CL2 is controlled, based on a second clutch control command from an AT controller 7, by a control hydraulic pressure produced by a second clutch hydraulic unit 8. For instance, a wet multi-disc clutch (or a wet multi-disc brake), in which an oil flow rate and a hydraulic pressure can be continuously controlled by means of a proportional solenoid, is used as the second clutch CL2.

By the way, the first clutch hydraulic unit 6 and the second clutch hydraulic unit 8 are both incorporated in an AT hydraulic control valve unit CVU attached to the automatic transmission AT.

Automatic transmission AT is a stepped automatic transmission whose number of speeds is limited or finite and wherein a shift stage of the finite shift stages, such as five-forward-and-one-reverse-speed, can be automatically switched depending on vehicle speed and accelerator opening and the like. Hence, the second clutch CL2 is selected from an optimum one (an optimum clutch or an optimum band brake arranged in a torque transmission path) of a plurality of frictional engagement elements, which are engaged at respective shift stages of automatic transmission AT, without using a newly-added, dedicated clutch. Instead of using an optimum one of frictional engagement elements of automatic transmission AT, as indicated by the two-dotted line in the drawing, as the second clutch a dedicated clutch may be interposed between motor generator MG and automatic transmission AT or interposed between automatic transmission AT and drive road wheels (rear-left and rear-right road wheels RL-RR).

The output shaft of automatic transmission AT is connected through propeller shaft PS, differential DF, left driveshaft DSL, and right driveshaft DSR to rear-left and rear-right road wheels RL-RR.

[Control System Configurtion]

The hybrid vehicle control system is hereunder explained.

As shown in FIG. 1, the hybrid vehicle control system of the first embodiment has the engine controller 1, the motor controller 2, the inverter 3, the battery 4, the first clutch controller 5, the first clutch hydraulic unit 6, the AT controller 7, the second clutch hydraulic unit 8, a brake controller 9, and an integrated controller 10. By the way, the engine controller 1, the motor controller 2, the first clutch controller 5, the AT controller 7, the brake controller 9, and the integrated controller 10 are connected to each other via a CAN (controller area network) communication line 11 that permits information exchange among them.

Engine controller 1 inputs information about engine speed from an engine speed sensor 12, a target engine torque command from the integrated controller 10, and other necessary information, and then outputs a command for controlling an engine operating point (engine speed Ne, engine torque Te) to a throttle valve actuator of engine Eng.

Motor controller 2 inputs information from a resolver 13 configured to detect a rotational position of the rotor of motor generator MG, a target MG torque command and a target MG speed command from the integrated controller 10, and other necessary information, and then outputs a command for a motor operating point (motor speed Nm, motor torque Tm) to the inverter 3. By the way, motor controller 2 is also configured to monitor a battery SOC (state of charge) representing a charge capacity of battery 4. The monitored battery SOC information is used as information for controlling motor generator MG, and also supplied via the CAN communication line 11 to the integrated controller 10.

The first clutch controller 5 inputs sensor information from a first clutch stroke sensor 15 configured to detect a stroke position of the piston 14a of hydraulic actuator 14, a target CL1 torque command from the integrated controller 10, and other necessary information, and then outputs a command for controlling engagement/disengagement of the first clutch CL1 to the first clutch hydraulic unit 6 incorporated in the AT hydraulic control valve unit CVU.

AT controller 7 inputs information from an accelerator opening sensor 16, a vehicle speed sensor 17, and other sensors 18 (i.e., a transmission input speed sensor, an inhibitor switch and the like). The AT controller is configured to retrieve an optimum shift stage based on a position at which an operating point, determined based on an accelerator opening APO and a vehicle speed VSP, exists on a shift map during running in a selected D (drive) range, and then outputs a control command for obtaining the retrieved shift stage to the AT hydraulic control valve unit CVU. In addition to the previously-noted automatic shift control, AT controller 7 is responsive to input information about a target CL2 torque command from the integrated controller 10 for executing second clutch control by which a command for controlling engagement/disengagement of the second clutch CL2 is outputted to the second clutch hydraulic unit 8 incorporated in the AT hydraulic control valve unit CVU.

Figure 8:
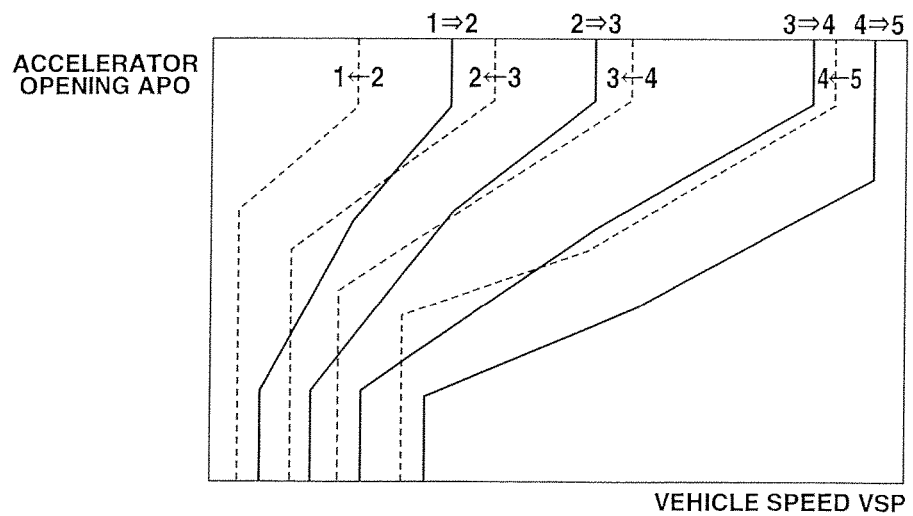
FIG. 8 is a shift map illustrating one example of a shift line of an automatic transmission used in the hybrid vehicle control device of the first embodiment.

By the way, the shift map means a map in which upshift lines and downshift lines are written in and drawn in relation to both the accelerator opening APO and the vehicle speed VSP. One example of the shift map is shown in FIG. 8.

Brake controller 9 inputs sensor information from wheel speed sensors 19 configured to detect respective wheel speeds of the four road wheels, and a brake stroke sensor 20, a regenerative-cooperation control command from the integrated controller 10, and other necessary information. For instance when a required braking force, determined based on a brake stroke BS during braking with a brake pedal depressed, cannot be sufficiently obtained by only a regenerative braking force, regenerative-cooperation brake control is executed to supplement such a deficiency of braking force with a mechanical braking force (i.e., a fluid-pressure braking force or a motor braking force).

Integrated controller 10 is configured to manage the entire consumed energy of the vehicle to perform a function that realizes vehicle running with a highest efficiency. The integrated controller inputs necessary information from a motor speed sensor 21 configured to detect motor speed Nm, and other sensors/switches 22, and information transmitted via the CAN communication line 11, and then outputs a target engine torque command to the engine controller 1, and outputs both a target MG torque command and a target MG speed command to the motor controller 2, and outputs a target CL1 torque command to the first clutch controller 5, and outputs a target CL2 torque command to the AT controller 7, and outputs a regenerative-cooperation control command to the brake controller 9.

Figure 2:
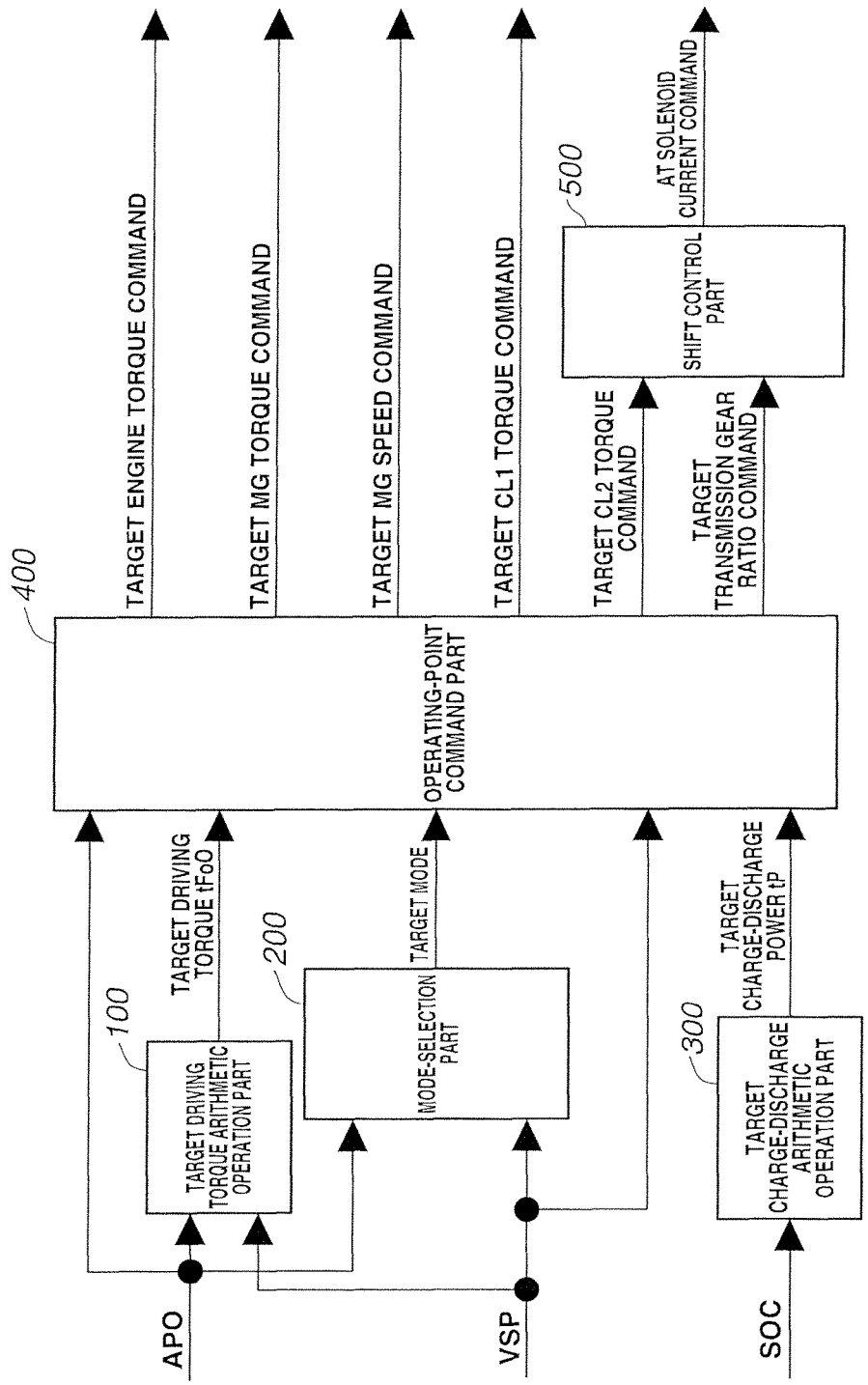
FIG. 2 is a control block diagram illustrating arithmetic processing executed within an integrated controller of the hybrid vehicle control device of the first embodiment.

FIG. 2 is the control block diagram illustrating arithmetic processing executed within the integrated controller 10 of a hybrid vehicle to which the hybrid vehicle control device of the first embodiment is applied. FIG. 3 is the EV-HEV selection map used to execute mode-selection processing within the integrated controller 10 of the hybrid vehicle. The arithmetic processing, executed within the integrated controller 10 of the first embodiment, is hereunder explained in reference to FIGS. 2-3.

As shown in FIG. 2, integrated controller 10 has a target driving torque arithmetic operation part 100, a mode-selection part 200, a target charge-discharge arithmetic operation part 300, an operating-point command part 400, and a shift control part 500.

Figure 4A:
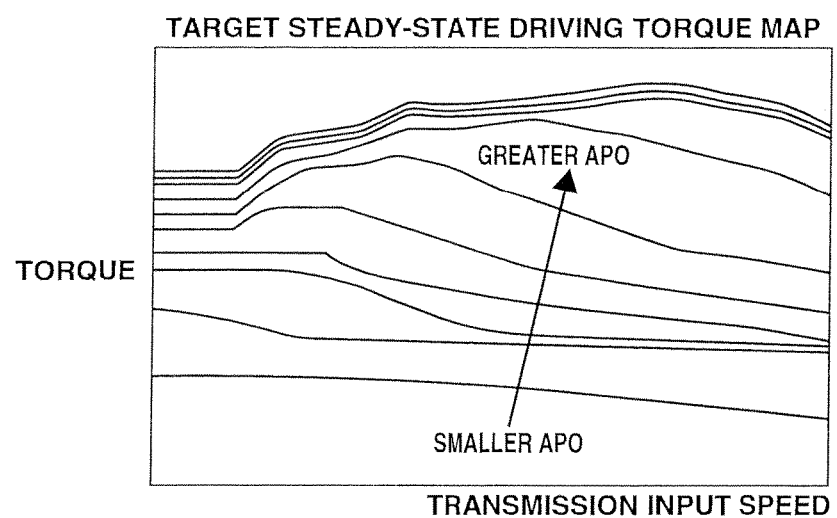
FIG. 4A is a target steady-state driving torque map used by the integrated controller of the hybrid vehicle control device of the first embodiment.
Figure 4B:
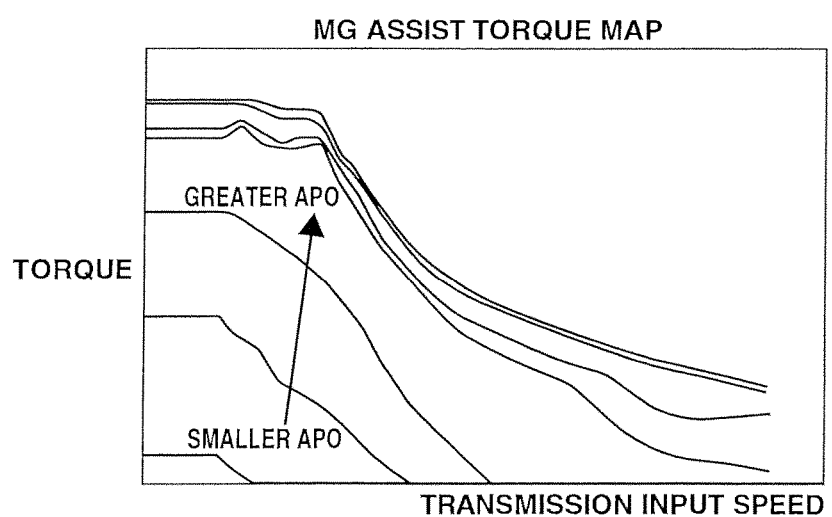
FIG. 4B is an MG assist torque map used by the integrated controller of the hybrid vehicle control device of the first embodiment.

Target driving torque arithmetic operation part 100 calculates or retrieves a target steady-state driving torque and a MG assist torque from both the accelerator opening APO and a transmission input speed based on vehicle speed VSP, while using the target steady-state driving torque map shown in FIG. 4A and the MG assist torque map shown in FIG. 4B.

Figure 5:
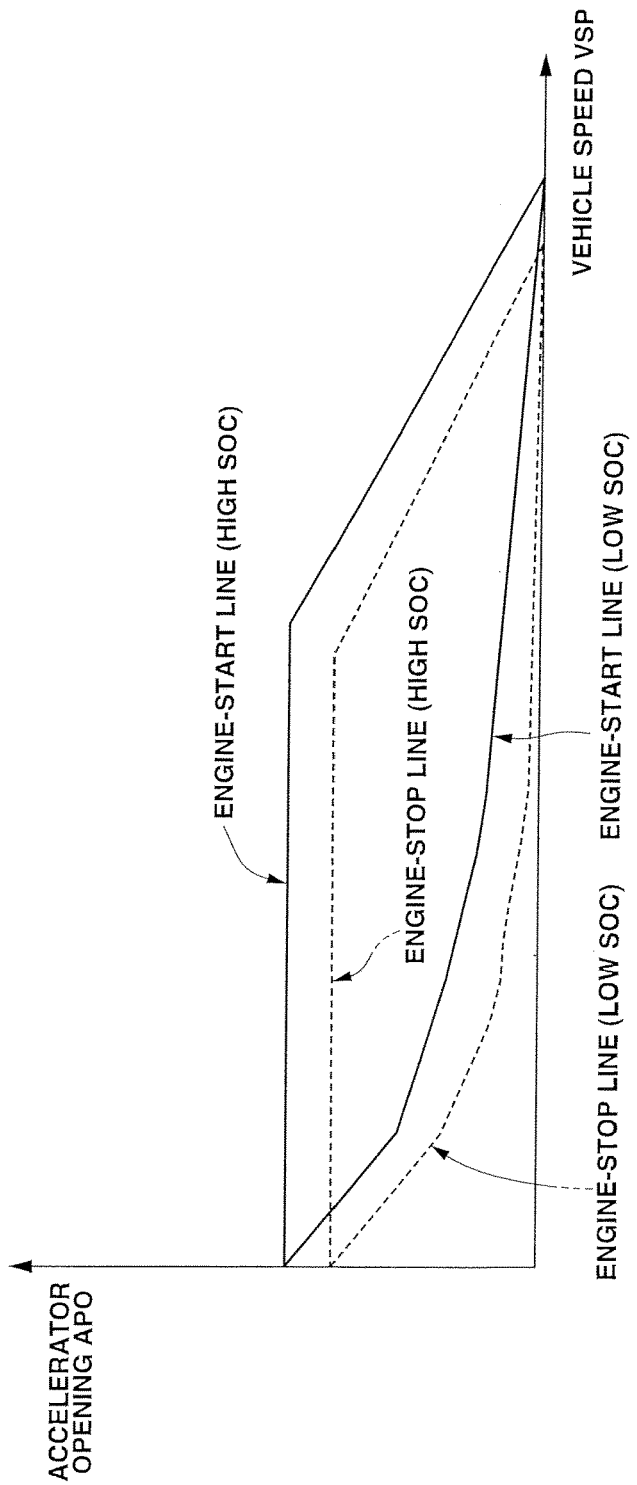
FIG. 5 is an engine-start/engine-stop map illustrating engine-start and engine-stop lines and used by the hybrid vehicle control device of the first embodiment.

Mode-selection part 200 selects either an "EV running mode" or an "HEV running mode" as a target running mode by the use of the engine-start/engine-stop map shown in FIG. 5 and set based on accelerator opening APO for every vehicle speed. By the way, the engine-start line and the engine-stop line both tend to lower in a direction for decreasing of the accelerator opening, as the battery SOC decreases.

Figure 6:
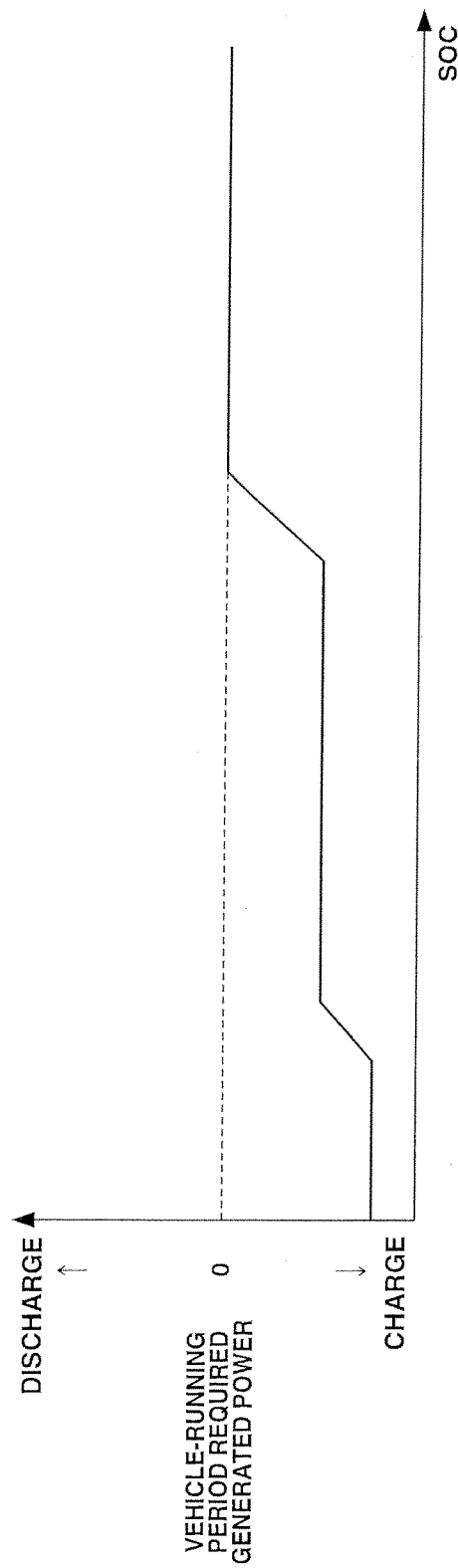
FIG. 6 is a characteristic diagram illustrating a vehicle-running period required generated power with respect to a battery SOC (state of charge) and used by the hybrid vehicle control device of the first embodiment.
Figure 7:
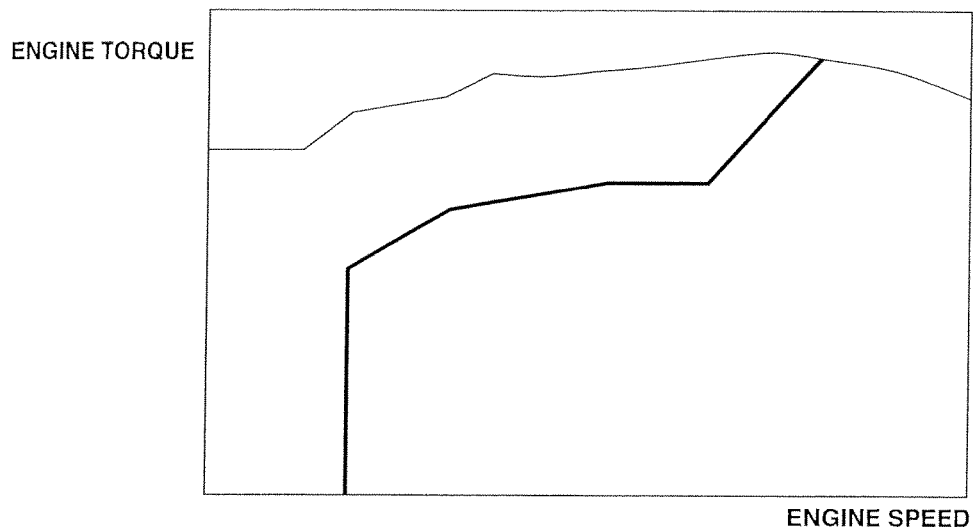
FIG. 7 is a characteristic diagram illustrating an engine optimum fuel consumption line used by the hybrid vehicle control device of the first embodiment.

Target charge-discharge arithmetic operation part 300 calculates or retrieves a target generated power based on the battery SOC by the use of the vehicle-running period required generated power map shown in FIG. 6. Target charge-discharge arithmetic operation part 300 also calculates an output required for increasing engine torque from the current operating point up to an optimum fuel consumption line indicated by the thick solid line in FIG. 7. An insufficiency of the output relative to the target generated output is added to the engine output as a required output.

Operating-point command part 400 calculates a transient target engine torque, a transient target MG torque, a transient MG speed, a transient target CL! torque, a transient target CL2 torque, and a target transmission gear ratio, based on the accelerator opening APO, the target driving torque tFo0, the MG assist torque, the target mode (the target running mode), the vehicle speed VSP, and the target charge-discharge power (the required generated power) tP, respectively serving as target arrival operating points. These computational results are outputted via the CAN communication line 11 to each of the controllers 1, 2, 5, and 7.

Furthermore, operating-point command part 400 executes engine start processing.

That is, when, during the EV running mode, the operating point, determined by the combination of accelerator opening APO and vehicle speed VSP, enters the HEV area, exceeding the EV→HEV mode-switching line, mode-selection part 200 executes mode-switching to the HEV running mode with engine-start from the EV running mode. Conversely when, during the HEV running mode, the operating point enters the EV area, exceeding the HEV→EV mode-switching line, mode-selection part 200 executes mode-switching from the HEV running mode to the EV running mode with engine-stop, separating the engine from the power-train system.

Operating-point command part 400 executes engine start processing responsively to the previously-discussed running-mode-switching, when, during the EV running mode, the accelerator opening APO exceeds the engine-start line shown in FIG. 5. The engine start processing is executed as follows.

First, a torque capacity of the second clutch CL2 is controlled so as to bring the second clutch into slip-engagement (a half-clutch state), and then engagement of the first clutch CL1 starts so as to increase engine speed when it has been determined that the second clutch CL2 begins to slip. Thereafter, immediately when the engine speed reaches an initial explosion speed, the engine Eng starts up. When the engine speed becomes approximately equal to the motor speed, the first clutch CL1 becomes fully engaged. Thereafter, the second clutch CL2 becomes locked-up, thereby enabling a mode transfer to the HEV running mode.

Shift control part 500 controls the drive of solenoid valves incorporated in the automatic transmission AT, based on the target CL2 torque capacity and the target transmission gear ratio, so as to achieve them.

FIG. 8 shows the shift line. That is, shift control part 500 determines the next shift stage to be shifted from the current shift stage, based on the vehicle speed VSP and the accelerator opening APO, and then executes gear-shifting by controlling shift clutches in the presence of a shifting requirement.

Figure 9:
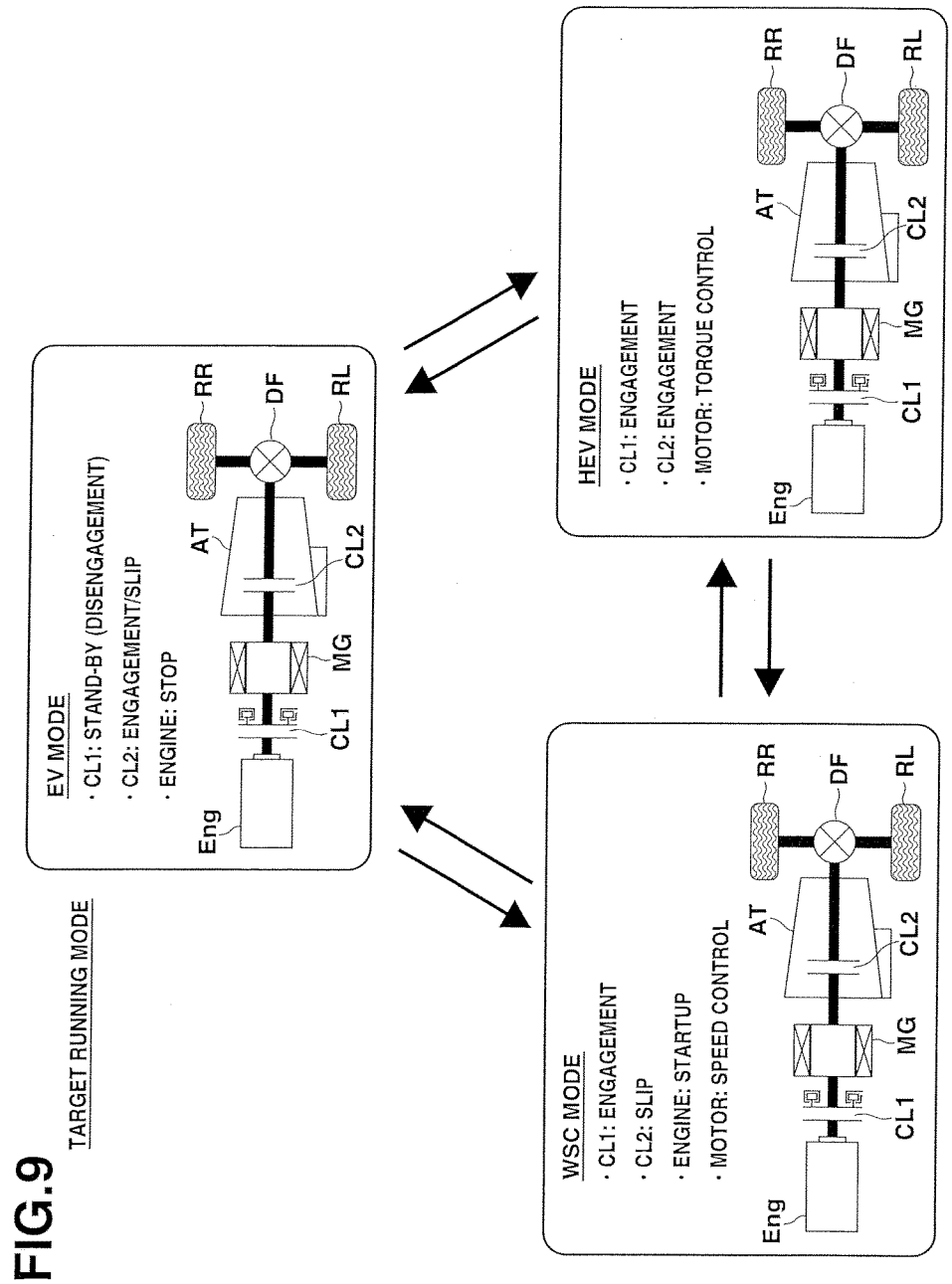
FIG. 9 is a target running mode diagram illustrating one example of a target running mode transfer in the hybrid vehicle control device of the first embodiment.

As shown in FIG. 9, in addition to the EV mode and the HEV mode, as an additional running mode the integrated controller 10 with the previously-discussed configuration is further configured to set a WSC mode during a transient period of mode-switching between these two running modes.

The EV mode is a running mode such that the vehicle runs by only the power produced by motor generator MG. In the EV mode, only the output rotation from motor generator MG is transmitted via the automatic transmission AT to rear-left and rear-right road wheels RL, RR with the first clutch CL1 disengaged (released) and the second clutch CL2 brought into engagement or slip-engagement, while keeping the engine Eng in its stopped state.

The HEV mode is a running mode such that the vehicle runs by both the power produced by engine Eng and the power produced by motor generator MG. In the HEV mode, the output rotation from engine Eng and the output rotation from motor generator MG are transmitted via the automatic transmission AT to rear-left and rear-right road wheels RL, RR, with the second clutch CL2 engaged and the first clutch CL1 engaged.

The WSC mode is a running mode such that the vehicle starts, while controlling the clutch torque capacity, when starting with P, N→D range selection from the "HEV" mode, or when starting in the D range from the "EV" mode or the "HEV" mode. In this case, the vehicle starts, while maintaining the slip-engagement state of the second clutch CL2 by speed control of motor generator MG, and torque-controlling such that the clutch transmitted torque, passing through or transmitted via the second clutch CL2, is brought into a required driving torque determined depending on the condition on the vehicle and by operation of the driver. At this time, a mode-switching shock can be absorbed by maintaining the second clutch CL2 in its slip-engagement state, thus contributing to a countermeasure against such a shock. By the way, the term "WSC" is an abbreviation for "Wet Start Clutch".

[Processing and Configuration of Engine Start Control Section]

Figure 10:
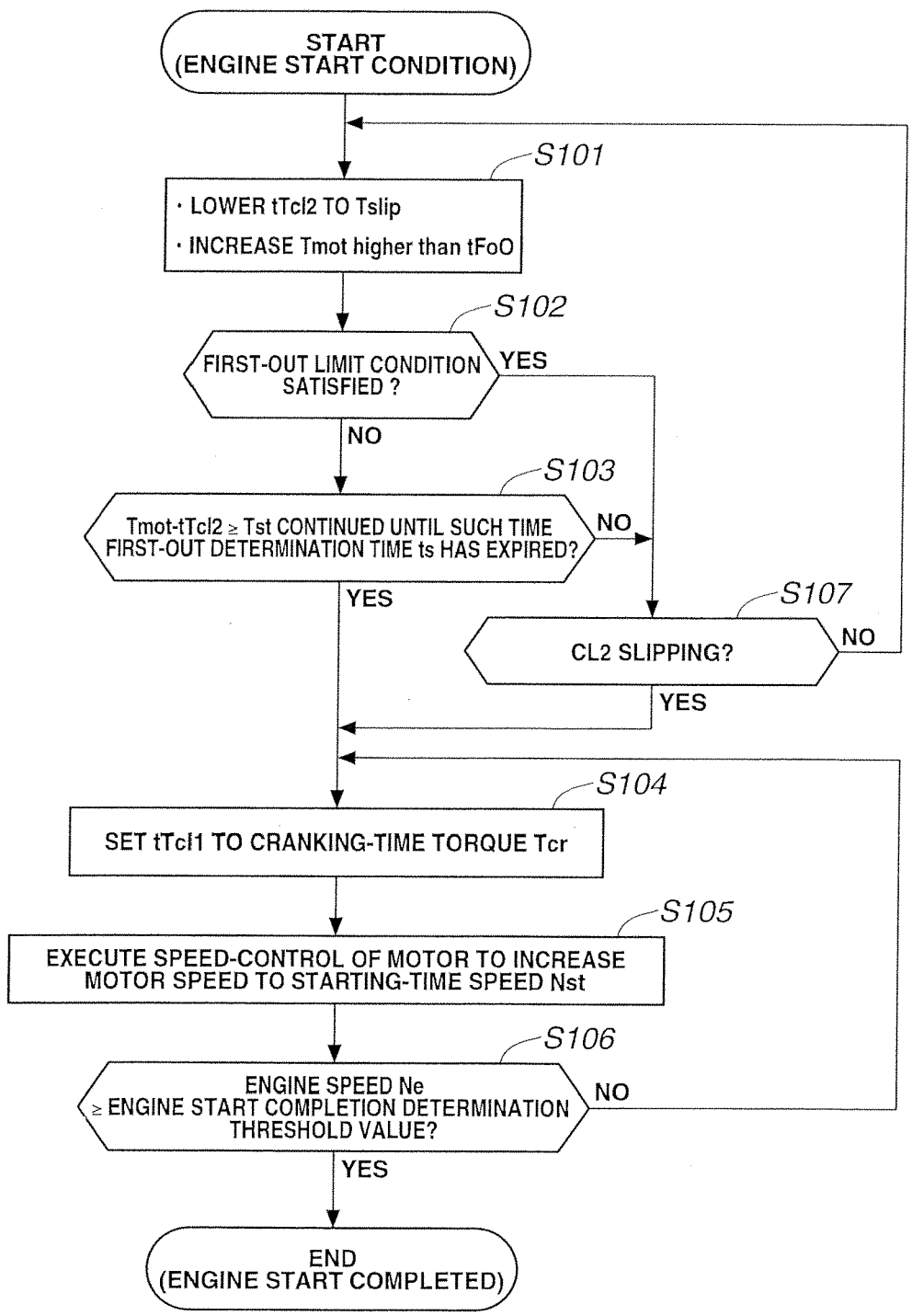
FIG. 10 is a flowchart illustrating the control flow of engine start control processing executed within the hybrid vehicle control device of the first embodiment.

FIG. 10 shows the flow of engine start control processing executed within a part corresponding to the engine start control section of integrated controller 10 during mode-transition from the EV mode to the HEV mode.

As discussed previously, the engine start control initiates at the time when the operating point, determined by both the accelerator opening APO and the vehicle speed VSP, goes across the engine-start line shown in FIG. 5.

At the initial step S101, a second clutch transmitted torque capacity command value tTcl2 is lowered to a slip-control value (a slip-control-period value) Tslip, and then maintained at this value. In parallel with this, a motor torque Tmot, which is the output torque of motor generator MG, is increased higher than the target driving torque tFo0 (the target steady-state driving torque). Thereafter, the routine proceeds to step S102.

At step S102, a check is made to determine whether a preset first-out limit condition is satisfied. When the preset first-out limit condition is satisfied, the routine proceeds to step S107. Conversely when the preset first-out limit condition is unsatisfied, the routine proceeds to step S103.

In the first embodiment, the above-mentioned first-out limit condition is provided for limiting or restricting execution of slip-start prediction (described later) of the second clutch CL2. When any one of the following four conditions has been satisfied, it is determined that the first-out limit condition has been satisfied. In other words, when any of the following four conditions is not satisfied, first-out first clutch engagement processing is executed based on the slip-start prediction (described later).

The first limit condition is a situation where a temperature of hydraulic oil used for engagement of both of the clutches CL1, CL2 is less than or equal to a preset temperature at which a delay in engagement is predicted.

The second limit condition is a situation where an accelerator operation amount (i.e., accelerator opening APO or a variation of the accelerator opening) is less than a preset value at which a slip of the second clutch CL2 hardly occurs.

The third limit condition is a situation where motor generator MG is kept in an output limit state in which the motor generator cannot output the motor torque Tmot of such magnitude as to cause a slip of the second clutch CL2.

The fourth limit condition is a situation where a temperature of water for cooling the inverter 3 is less than or equal to a preset temperature value at which a preset output (that is, the motor torque Tmot of such magnitude as to cause a slip of the second clutch CL2) cannot be produced by the motor generator MG.

Subsequently to step S102 determining that the first-out limit condition is unsatisfied, at step S103 a check is made to determine whether a first-out engagement-start command condition is satisfied. When the first-out engagement-start command condition is satisfied, the routine proceeds to step S104. Conversely when the first-out engagement-start command condition is unsatisfied, the routine proceeds to step S107.

The first-out engagement-start command condition of step S103 is a necessary condition for commanding engagement of the first clutch CL1 before the second clutch CL2 begins to actually slip in the presence of slip-start prediction of the second clutch CL2. Concretely, the first-out engagement-start command condition is a specific condition in which a state that the difference between the motor torque Tmot and the second clutch transmitted torque capacity command value tTcl2 exceeds a preset slip prediction determination threshold value Tst occurs and then this state has continued until such time that a preset first-out determination time ts has expired.

By the way, the slip prediction determination threshold value Tst is set such that a required time required to bring the second clutch CL2 into a slip state from the time when the difference between the motor torque Tmot and the second clutch transmitted torque capacity command value tTcl2 exceeds the slip prediction determination threshold value Tst is identical to a required time required to bring the first clutch into an engagement state from the time when an engagement command is outputted to the first clutch CL1. The setting of the slip prediction determination threshold value is performed based on actually measured data measured beforehand or simulated data. Also, the slip prediction determination threshold value is set based on the previously-noted required times under a situation that it is very difficult for the first clutch CL1 to be engaged.

Figure 11:
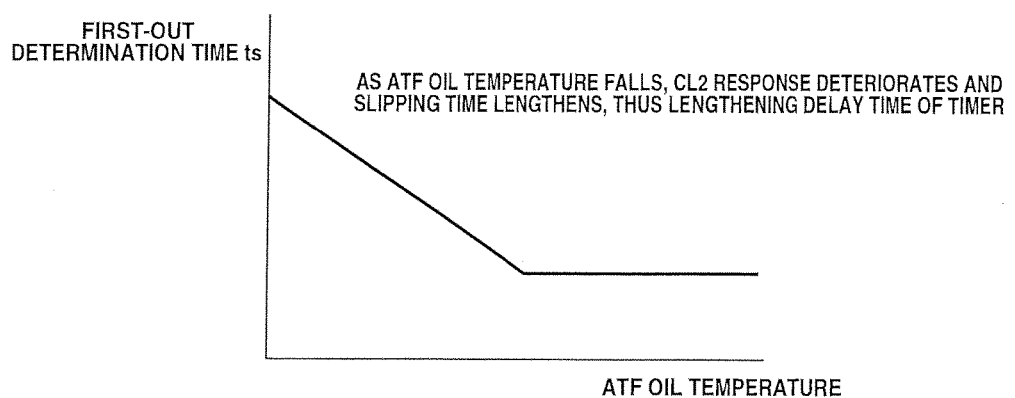
FIG. 11 is a characteristic diagram for setting a first-out determination time used by the integrated controller at step S103 of FIG. 10.

Concretely, as seen from the first-out condition characteristic map of FIG. 11, the aforementioned first-out determination time ts is set based on a temperature of ATF oil (automatic transmission fluid). That is, as the temperature of ATF oil falls, the responsiveness of the second clutch CL2 tends to deteriorate, and thus a defay in slip start timing of the second clutch occurs. Therefore, the delay time of a timer is set to a constant value when the temperature of ATF oil is higher than or equal to a predetermined value. The delay time of the timer is set to be lengthened, as the oil temperature decreases from the predetermined value.

Subsequently to step S102 determining that the first-out limit condition is satisfied, at step S107 a check is made to determine whether a slip of the second clutch CL2 is occurring. When the slip is occurring, the routine proceeds to step S104. Conversely when the slip is not occurring, the routine returns back to step S101. By the way, a slipping state of the second clutch CL2 is determined based on the difference of rotation between the input-side rotation and the output-side rotation of the second clutch CL2, that is, determined based on the input-and-output rotation difference of automatic transmission AT and the transmission gear ratio.

At step S104, a first clutch transmitted torque capacity command value tTcl1 is set to a preset cranking torque (a cranking-time torque) Tcr, and thus the first clutch is brought into slip-engagement. After having been brought into slip-engagement, the routine proceeds to step S105.

The cranking-time torque Tcr is set within a specific range defined by the following expression, for the purpose of increasing the driving torque and maintaining a stable slip of the second clutch CL2.

$$Tcl1\min < Tcr < Tm\max - tTcl2 = Tm\max - tTi$$

where Tcl1min is set to an engine friction value before igniting the engine, and set to zero after having been ignited, Tmmax denotes a maximum torque of motor generator MG, tTcl2 denotes the second clutch transmitted torque capacity command value, and tTi denotes a target transmission input torque, which is set to the target driving torque tFo0.

At the next step S105, motor generator MG is speed-controlled so as to increase the motor speed Nm up to a preset starting-time speed Nst. Thereafter, the routine proceeds to step S106.

At step S106, a check is made to determine whether engine speed Ne becomes greater than or equal to a preset engine start completion determination threshold value. When engine speed Ne engine start completion determination threshold value, it is determined that the engine start has been completed and thus the routine proceeds to "END". Conversely when engine speed Ne<engine start completion determination threshold value, the routine returns back to step S104. By the way, when it is determined that the engine start has been completed, the first clutch CL1 and the second clutch CL2 are both brought into their fully-engaged states.

In the following two situations, via steps S104-S105 the first clutch CL1 is brought into slip-engagement and cranking operation of engine Eng is started, while increasing motor speed Nm.

One situation is a situation where the first-out limit condition is unsatisfied and the first-out engagement-start command condition is satisfied (see the flow of steps S102→S103→S104).

The other situation is a situation where the first-out limit condition is satisfied and the second clutch CL2 has been actually brought into a slip state (see the flow of steps S102→S107→S104).

(Operation of First Embodiment)

Next, the operation of the first embodiment is explained with reference to an example of operation shown in the time charts of FIGS. 12-14.

This example is an example of operation such that the driver depresses the accelerator pedal from a coast running state in an EV mode for accelerating operation, and then a transition to a HEV mode occurs.

The time t0 shown in the time chart is a point of time at which the vehicle is in a coast running state of zero accelerator opening in an EV mode, and hence the second clutch CL2 is controlled to an engagement state.

Under this condition, from the time t1, depressing operation of the accelerator pedal is started. Thus, accelerator opening APO begins to rise, and thereafter accelerator opening APO is kept constant.

Figure 12:
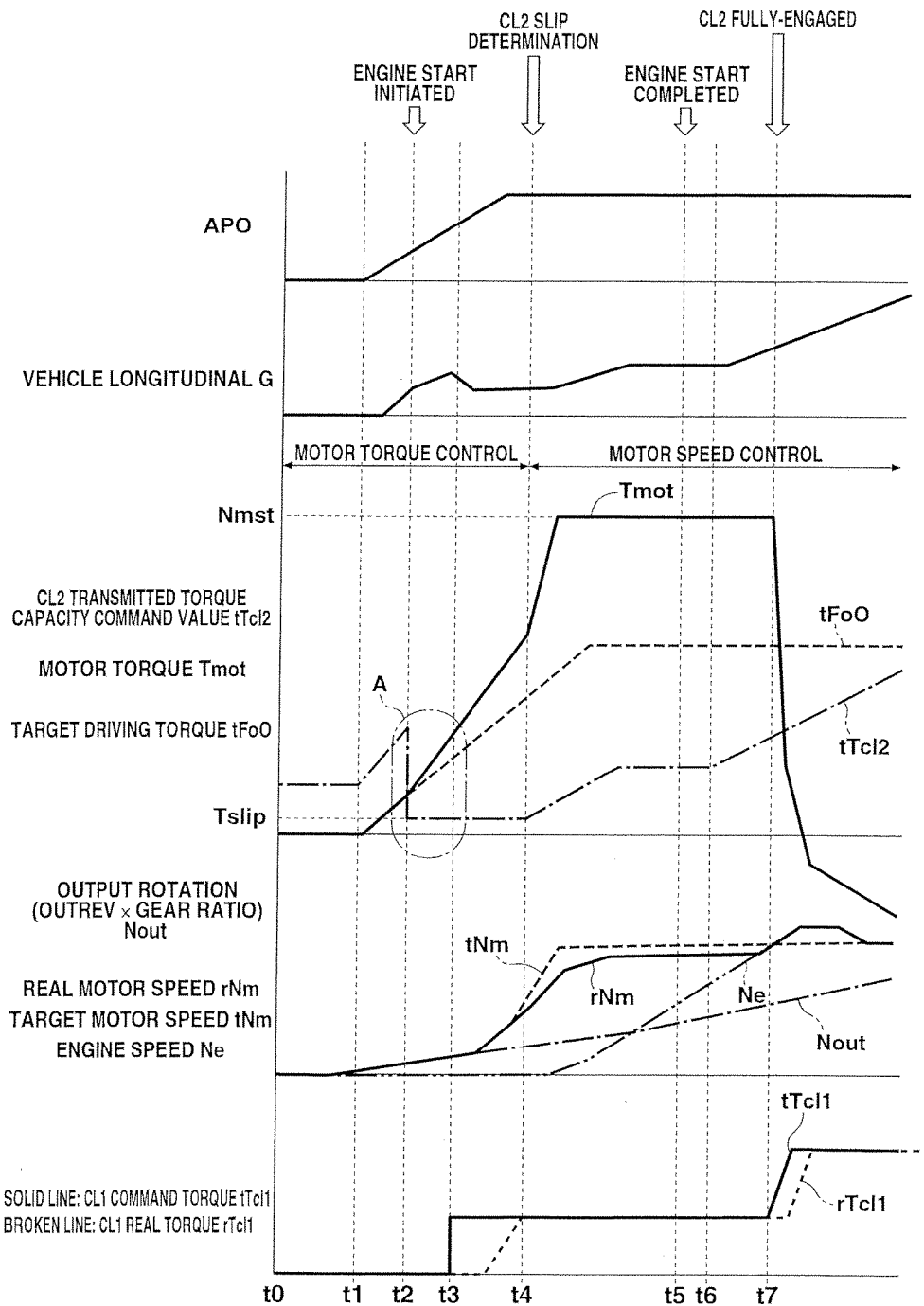
FIG. 12 is a time chart illustrating an example of operation of the hybrid vehicle control device of the first embodiment.

The operation under this situation is hereunder explained briefly in reference to FIG. 12.

At the time t2, the determination of engine-start is made, and thus engine start control is initiated. The determination is made depending on whether an operating point, determined by accelerator opening APO and vehicle speed VSP, goes across the engine-start line (see FIG. 5).

Immediately when the determination of engine-start is made, the second clutch transmitted torque capacity command value tTcl2 is lowered to the slip-control-period value Tslip for bringing the second clutch CL2 into a slip. In addition to the above, motor torque Tmot is increased higher than the target driving torque tFo0.

Thereafter, the first clutch CL1 is brought into slip-engagement such that motor rotation is inputted to the engine Eng for starting cranking operation of the engine Eng (see the time t3).

Furthermore, from the time t4, motor generator MG is speed-controlled such that engine speed Ne is increased up to the starting-time speed Nst. In this manner, immediately when it is determined that the engine start has been completed (see the time t5), the second clutch CL2 is controlled to a fully-engaged state, while decreasing the slip amount of the second clutch (see the time t6). Additionally, the first clutch CL1 is controlled to a fully-engaged state (see the time t7).

(Task to be Solved by Comparative Example)

The task of the comparative example during the engine start control is hereunder explained in reference to the time chart of FIG. 14.

In a similar to the example of operation shown in FIG. 12, in the example of operation shown in FIG. 14, at the time t00, the vehicle is in a coast running state of zero accelerator opening in an EV mode. Under this condition, from the time t31, depressing operation of the accelerator pedal is started, and thus accelerator opening APO begins to rise. At the time t32, the determination of engine-start is made.

Due to the determination of engine-start made, at the time t32, to bring the second clutch CL2 into a slip, the second clutch transmitted torque capacity command value tTcl2 is lowered to the slip-control-period value Tslip such that a slip starts to develop. At the same time, motor torque Tmot of motor generator MG is increased. At this time, to suppress a gear play elimination shock, an increase in motor torque Tmot is limited to a gear play elimination limit value for a prescribed time period (see the time period t33-t34).

In such a case, the slip starting point of the second clutch CL2 is the time t35 in the comparative example shown in FIG. 14. That is, it takes a required time for starting a slip of the second clutch CL2, for the following possible reasons, namely, the first reason and the second reason.

The first reason for the required time is that it is difficult to sufficiently decrease the transmitted torque capacity of the second clutch in comparison with the motor torque Tmot of the input side, when bringing the second clutch CL2 into a slip in a low motor-torque state (like the time t32).

The second reason for the required time is control for a gear play elimination. That is, when a transition from a coast state to a drive state occurs in the automatic transmission AT, owing to reversal of the rotation direction of gears, a gear play elimination arises from a relative displacement between the gears by a circumferential clearance. As a result, a shock occurs. Such a shock, caused by a gear play elimination, can be suppressed by limiting or restricting an increase in motor torque Tmot for a prescribed time period (for the time period t33-t34). However, owing to execution of the control for limiting an increase in motor torque Tmot, the time required for a sufficient rise in motor torque Tmot tends to lengthen, and thus a slip of the second clutch CL2 also tends to delay.

Hitherto, engagement timing of the first clutch CL1 was determined based on only the time elapsed from initiation of engine start determination processing. Therefore, the engagement timing has to be set to a point of time after the time t35, fully taking account of a response delay in the second clutch CL2.

Hence, a set time of the timer, that is, engagement command timing of the first clutch CL1 has to be set to a time nearby the time t4 of FIG. 12.

As discussed above, in the comparative example, engagement command timing of the first clutch CL1 is set by the timer and the setting of engagement command timing is based on a time anticipating a response delay of the second clutch CL2. For this reason, it always takes a required time for engaging the first clutch CL1, and thus a required time from the determination of engine-start to the actual engine start tends to lengthen. Such a state would be likely to cause the driver to feel a deteriorated accelerating response (a deteriorated accelerator response) owing to a delay of actual vehicle accelerating condition from initiation of accelerating operation.

(Comparison Between Comparative Example and First Embodiment)

Figure 13:
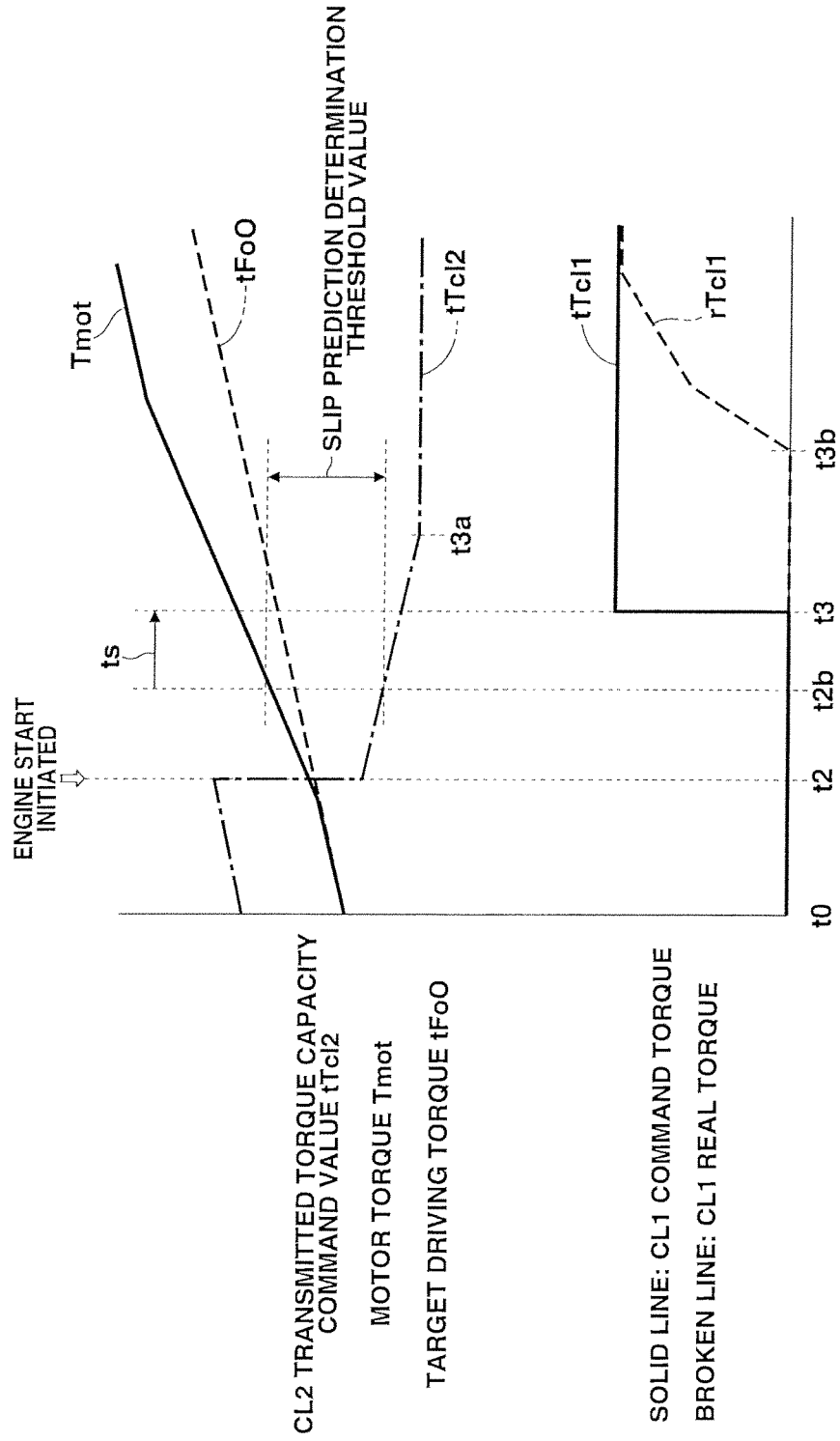
FIG. 13 is an enlarged view of an "A" section marked with a circle indicated by a dashed line in the time chart of FIG. 12.

The operation of the first embodiment is explained in detail in reference to FIGS. 12-13, for clarifying the difference of the first embodiment from the comparative example.

In the first embodiment, at the time t2, the determination of engine-start is made, and then engine start control initiates. In a similar manner to the comparative example, the second clutch transmitted torque capacity command value tTcl2 is lowered to the slip-control-period value Tslip.

At this time, as seen from the enlarged view of FIG. 13, the second clutch transmitted torque capacity command value tTcl2 greatly drops once, and thereafter gradually reduces to the slip-control-period value Tslip. In the example of this drawing, at the time t2b, the difference between the second clutch transmitted torque capacity command value tTcl2 and the motor torque Tmot exceeds the slip prediction determination threshold value Tst. At the time t2b, any slip of the second clutch CL2 does not yet occur.

Thereafter, at the time t3 at which the specified state that the difference between the second clutch transmitted torque capacity command value tTcl2 and the motor torque Tmot has exceeded the slip prediction determination threshold value Tst has continued until such time that the first-out determination time ts has expired, the first-out engagement-start command condition becomes satisfied. Responsively to the satisfied first-out engagement-start command condition, an engagement command of the first clutch CL1 is outputted. By the way, owing to a response delay in hydraulic pressure, the timing at which the first clutch CL1 is actually brought into a slip-engagement state, becomes the time t3b.

The timing t3b is a later time than a point of time nearby the time t3a when the transmitted torque capacity of the second clutch CL2 actually reaches the slip-control-period value Tslip and a slip state occurs. Hence, it is possible to suppress torque fluctuations, which may occur owing to the start of slip-engagement of the first clutch CL1, from being transmitted to the side of drive road wheels. That is, it is possible to avoid a trouble that the slip start timing of the second clutch CL2 and the slip-engagement start timing of the first clutch CL1 are reversed undesirably.

As set out above, in the first embodiment, slip-start prediction of the second clutch CL2 is made at the point of time when the difference between the second clutch transmitted torque capacity command value tTcl2 and the motor torque Tmot exceeds the slip prediction determination threshold value Tst and thus an engagement command is outputted to the first clutch CL1.

Therefore, it is possible to output an engagement command of the first clutch CL1 at an earlier time, as compared to the system in which an engagement command of the first clutch CL1 is always outputted after a prescribed time period has expired from the determination of engine-start.

Subsequently to the above, a specific situation where a temperature of hydraulic oil used for engagement of both the clutches CL1, CL2 is low or the output of motor torque Tmot is limited, and it takes a required time for starting a slip of the second clutch CL2, and thus it is difficult to predict slip-start of the second clutch CL2 is hereunder explained.

In such a specific situation, the first-out limit condition is satisfied through step S102 of FIG. 10. Therefore, at step S107 a check is made to determine whether a slip of the second clutch CL2 is actually occurring, without making a determination as to whether the first-out engagement-start command condition is satisfied or unsatisfied through step S103. Responsively to the determination of slip made, an engagement command is outputted to the first clutch CL1.

In this manner, even in the specific situation where slip-prediction of the second clutch CL2 is difficult, it is possible to output an engagement command of the first clutch CL1 based on the actual occurrence of a slip of the second clutch. Hence, it is possible to prevent a trouble that the first clutch CL1 is undesirably engaged prior to the start of a slip of the second clutch CL2.

Additionally, the previously-discussed first to fourth conditions are set as the first-out limit condition, and thus it is possible to more certainly prevent the troubles as discussed above.

Effects of First Embodiment

The effects of the first embodiment are enumerated as follows:

1) The hybrid vehicle control device of the first embodiment is provided with an engine Eng and a motor generator MG both serving as a driving power source of a vehicle, a first clutch CL1 arranged in a power-train system from the driving power source to rear-left and rear-right road wheels RL, RR serving as drive road wheels, the first clutch being interposed between the engine Eng and the motor generator MG for varying a transmitted torque capacity between both the engine and the motor generator, and a second clutch CL2 arranged in the power-train system, the second clutch being interposed between the motor generator MG and the rear-left and rear-right road wheels RL, RR serving as the drive road wheels for varying a transmitted torque capacity between both the motor generator and the drive road wheels, an integrated controller 10 configured to execute processing of steps S101-S107 as an engine start control section, which is configured to start the engine Eng by bringing the first clutch CL1 into engagement, while slipping the second clutch CL2, and by increasing a driving torque of the motor generator MG, when it is determined that an engine start request is present by an engine start request determination means for determining the presence or absence of a start request of the engine Eng, in an EV mode that enables the vehicle to run by the driving torque produced by the motor generator MG with the first clutch CL1 disengaged and with the second clutch CL2 engaged, and a processing section configured to execute processing of steps S103-S104 as a first clutch engagement control section, which is included in the integrated controller 10 and configured to command a start of engagement of the first clutch CL1 once a difference between the motor torque Tmot and a second clutch transmitted torque capacity command value tTcl2 corresponding to a transmitted torque capacity of the second clutch becomes greater than or equal to a preset slip prediction determination threshold value Tst after having been determined that the engine start request is present.

It is possible to predict, based on the difference between motor torque Tmot and second clutch transmitted torque capacity command value tTcl2, slip-occurrence timing of the second clutch CL2. Therefore, it is possible to advance engagement timing of the first clutch CL1 by outputting an engagement-start command of the first clutch CL1 responsively to the predicted timing, as compared to the system in which an engagement command of the first clutch CL1 is outputted at uniform timing. Hence, it is possible to shorten a time length from initiation of engine start to completion of engine start, thus advancing the timing at which engine torque is transmitted to the drive road wheels, and consequently improve the accelerator response.

Additionally, a prediction (a determination) of slip-occurrence timing of the second clutch CL2 is determined depending on whether the difference between motor torque Tmot and second clutch transmitted torque capacity command value tTcl2 exceeds the slip prediction determination threshold value Tst. Hence, it is possible to predict more accurately slip timing of the second clutch CL2 by appropriately setting the slip prediction determination threshold value Tst, thus permitting the second clutch CL2 to be brought into a slip, prior to actually bringing the first clutch CL1 into engagement.

Furthermore, in the first embodiment, in arithmetically calculating the difference between the motor torque and the transmitted torque capacity of the second clutch for the purpose of determining whether the first-out engagement-start command condition is satisfied, the second clutch transmitted torque capacity command value tTcl2 is used and regarded to be equivalent to the transmitted torque capacity of the second clutch. As discussed above, the second clutch transmitted torque capacity command value tTcl2, serving as existing signal data, is utilized. Thus, it is possible to execute or realize the control at reduced costs.

2) In the hybrid vehicle control device of the first embodiment, the processing section configured to execute processing of steps S103-S104 as the first clutch engagement control section, is configured to set an engagement-start command condition of the first clutch as a specific condition where a state that the difference between motor torque Tmot and second clutch transmitted torque capacity command value tTcl2 exceeds the slip prediction determination threshold value Tst has continued until such time that a preset first-out determination time ts has expired.

There is a response delay in the second clutch CL2. Fully taking account of the response delay, a specific condition where a state that the difference between motor torque Tmot and second clutch transmitted torque capacity command value tTcl2 exceeds the slip prediction determination threshold value Tst has continued until such time that the preset first-out determination time ts has expired is set to the engagement-start command condition of the first clutch. Hence, it is possible to more certainly realize the effect as recited in the item 1).

3) In the hybrid vehicle control device of the first embodiment, the processing section configured to execute processing of steps S103-S104 as the first clutch engagement control section, is configured to set the first-out determination time ts based on a temperature of ATF oil used to engage the second clutch CL2.

As the temperature of ATF oil falls, a required time required for a torque release (torque drop) of the second clutch CL2 tends to lengthen, and thus a required time required to bring the second clutch into a slip state also tends to lengthen. Therefore, it is possible to always set the optimum first-out determination time ts by setting the first-out determination time ts depending on a temperature of ATF oil. Hence, it is possible to more certainly realize the effects as recited in the items 1)-2).

4) In the hybrid vehicle control device of the first embodiment, the processing section configured to execute processing of steps S103-S104 as the first clutch engagement control section is configured to make a determination as to whether the second clutch CL2 is actually slipping, regardless of whether the engagement-start command condition of the first clutch is satisfied or unsatisfied, when a preset slip prediction limit condition for limiting slip prediction is satisfied, and to command, based on the determination of the second clutch actually slipping, the start of engagement of the first clutch CL1 (see the processing of steps S102→S107→S104).

In the shown embodiment, slip-occurrence timing of the second clutch CL2 is predicted based on the difference between the motor torque Tmot and the second clutch transmitted torque capacity command value tTcl2 used and regarded to be equivalent to the transmitted torque capacity of the second clutch. However, a situation where it is difficult to predict slip-occurrence timing as discussed above exists. For instance, one situation is that, owing to a lack of motor torque Tmot, a sufficient input torque to the second clutch CL2 cannot be obtained. Another situation is that a temperature of hydraulic oil used for operation (engagement) of the second clutch CL2 is low.

Therefore, the slip prediction limit condition, corresponding to the previously-noted situation where slip prediction is difficult, is preset. When the preset slip prediction limit condition is satisfied, by the use of a determination as to whether a slip of the second clutch CL2 is actually occurring, it is avoid the control based on low-accuracy slip prediction from being executed.

5) In the hybrid vehicle control device of the first embodiment, the slip prediction limit condition of the processing section configured to execute processing of steps S103-S104 as the first clutch engagement control section is any one of a situation where a temperature of hydraulic oil used for engagement of both the clutches CL1, CL2 is less than or equal to a preset temperature at which a delay in engagement is predicted, a situation where an accelerator operation amount is less than a preset value at which the slip of the second clutch CL2 hardly occurs, a situation where the motor generator MG is kept in an output limit state in which the motor generator cannot output the torque of such magnitude as to cause the slip of the second clutch CL2, and a situation where a temperature of water for an inverter 3 is less than or equal to a preset temperature value at which a preset output cannot be produced by the motor generator MG.

Therefore, in the previously-discussed situations where slip prediction is difficult, it is possible to more certainly limit slip prediction, thereby avoiding an engagement command of the first clutch CL1 from being outputted based on low-accuracy slip prediction.

While the foregoing is a description of the embodiments carried out the hybrid vehicle control device of the invention, it will be understood that the invention is not limited to the particular embodiments shown and described herein, but that various design changes and modifications may be made without departing from the scope or spirit of this invention as defined by the following claims.

For instance, in the shown embodiment, a rear-wheel-drive vehicle is exemplified as a hybrid vehicle, but the device of the embodiment may be applied to a front-wheel-drive vehicle or a four-wheel-drive vehicle.

Also, in the shown embodiment, in calculating the difference between a motor torque and a transmitted torque capacity of the second clutch for determining whether a first-out engagement-start command condition is satisfied, the first clutch engagement control section uses a second clutch transmitted torque capacity command value as the transmitted torque capacity of the second clutch. However, it will be understood that the invention is not limited to this particular command value. In lieu thereof, the actually measured data of a transmitted torque capacity of the second clutch may be used.

Additionally, in the shown embodiment, as a slip prediction limit condition, four limit conditions, namely, a) the first condition being a situation where a temperature of hydraulic oil used for engagement of both the clutches is less than or equal to a preset temperature at which a delay in engagement is predicted, b) the second condition being a situation where an accelerator operation amount is less than a preset value at which a slip of the second clutch hardly occurs, c) the third condition being a situation where the motor is kept in an output limit state in which the motor cannot output the motor torque of such magnitude as to cause the slip of the second clutch, and d) the fourth condition being a situation where a temperature of water for an inverter is less than or equal to a preset temperature value at which a preset output cannot be produced by the motor are exemplified. A determination of the slip prediction limit condition is made based on whether any one of the four limit conditions is satisfied. However, the slip prediction limit condition is not limited to such complete utilization of all of the four limit conditions. For instance, in lieu thereof, three or less combined conditions of the four limit conditions a)-d) may be utilized as a slip prediction limit condition. Also, the slip prediction limit condition may be set as a logical product (AND operation) of at least two of the four limit conditions a)-d).

CROSS REFERENCE OF RELATED APPLICATION

The present application is a priority application whose right of priority is claimed based on Japanese Patent Application No. 2012-280504 (filed on Dec. 25, 2012 with the Japanese patent office), the entire contents of which are incorporated herein by reference.

The invention claimed is:

1. A hybrid vehicle control device comprising:
an engine and a motor both serving as a driving power source of a vehicle;
a first clutch arranged in a power-train system of the driving power source to drive road wheels, the first clutch being interposed between the engine and the motor for varying a transmitted torque capacity between both the engine and the motor;
a second clutch arranged in the power-train system, the second clutch being interposed between the motor and the drive road wheels for varying a transmitted torque capacity between both the motor and the drive road wheels; and
a controller;
wherein the controller is configured to start the engine by bringing the first clutch into engagement, while slipping the second clutch, and by increasing a driving torque of the motor, when it has been determined that an engine start request is present, in an electric vehicle driving (EV) mode that enables the vehicle to run by the driving torque of the motor with the first clutch disengaged and with the second clutch engaged,
wherein the controller is further configured to command a start of engagement of the first clutch once a first-out engagement-start command condition, in which a difference between the driving torque of the motor and a transmitted torque capacity of the second clutch becomes greater than or equal to a preset slip prediction determination threshold value after it has been determined that the engine start request is present, is satisfied, and
wherein the slip prediction determination threshold value is preset such that a period of time required to bring the second clutch into a slip state from a time when the difference between the driving torque of the motor and the transmitted torque capacity of the second clutch exceeds the slip prediction determination threshold value is identical to a period of time required to bring the first clutch into an engagement state from a time when an engagement command is outputted to the first clutch.

2. A hybrid vehicle control device as recited in claim 1, wherein:
the controller is further configured to set the first-out engagement-start command condition as a specific condition where a state that the difference exceeds the slip prediction determination threshold value has continued until a preset first-out determination time has expired.

3. A hybrid vehicle control device as recited in claim 2, wherein:
the controller is further configured to set the first-out determination time based on a temperature of hydraulic oil used to engage the second clutch.

4. A hybrid vehicle control device as recited in claim 1, wherein:
the controller is further configured to make a determination as to whether the second clutch is actually slipping, regardless of whether the first-out engagement-start command condition is satisfied or unsatisfied, when a preset slip prediction limit condition of the controller for limiting slip prediction is satisfied, and the controller is further configured to command, based on the determination of the second clutch actually slipping, the start of engagement of the first clutch.

5. A hybrid vehicle control device as recited in claim 4, wherein the slip prediction limit condition of the controller includes at least one of:
   a situation where a temperature of hydraulic oil used for engagement of both the first and second clutches is less than or equal to a preset temperature at which a delay in engagement is predicted,
   a situation where an accelerator operation amount is less than a preset value at which the slip of the second clutch hardly occurs,
   a situation where the motor is kept in an output limit state in which the motor cannot output the motor torque of such magnitude as to cause the slip of the second clutch, and
   a situation where a temperature of water for an inverter is less than or equal to a preset temperature value at which a preset output cannot be produced by the motor.

6. An engine start control method of a hybrid vehicle employing an engine and a motor both serving as a driving power source of a vehicle, a first clutch arranged in a power-train system of the driving power source to drive road wheels, the first clutch being interposed between the engine and the motor for varying a transmitted torque capacity between both the engine and the motor, and a second clutch arranged in the power-train system, the second clutch being interposed between the motor and the drive road wheels for varying a transmitted torque capacity between both the motor and the drive road wheels, the method comprising:
   starting the engine by bringing the first clutch into engagement, while slipping the second clutch, and by increasing a driving torque of the motor, when it has been determined that an engine start request is present, in an electric vehicle driving (EV) mode that enables the vehicle to run by the driving torque of the motor with the first clutch disengaged and with the second clutch engaged; and
   commanding a start of engagement of the first clutch once a first-out engagement-start command condition, in which a difference between the driving torque of the motor and a transmitted torque capacity of the second clutch becomes greater than or equal to a preset slip prediction determination threshold value after it has been determined that the engine start request is present, is satisfied,
   wherein the slip prediction determination threshold value is preset such that a period of time required to bring the second clutch into a slip state from a time when the difference between the driving torque of the motor and the transmitted torque capacity of the second clutch exceeds the slip prediction determination threshold value is identical to a period of time required to bring the first clutch into an engagement state from a time when an engagement command is outputted to the first clutch.

* * * * *